US011917372B2

(12) United States Patent
Schepker et al.

(10) Patent No.: US 11,917,372 B2
(45) Date of Patent: Feb. 27, 2024

(54) EARDRUM ACOUSTIC PRESSURE ESTIMATION USING FEEDBACK CANCELLER

(71) Applicant: Starkey Laboratories, Inc., Eden Prairie, MN (US)

(72) Inventors: Henning Schepker, Oldenburg (DE); Christophe D. Micheyl, Saint Genis Laval (FR); Jumana Harianawala, Eden Prairie, MN (US); Joyce Rosenthal, Golden Valley, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 41 days.

(21) Appl. No.: 17/811,460

(22) Filed: Jul. 8, 2022

(65) Prior Publication Data

US 2023/0020280 A1 Jan. 19, 2023

Related U.S. Application Data

(60) Provisional application No. 63/220,118, filed on Jul. 9, 2021.

(51) Int. Cl.
*H04R 25/00* (2006.01)

(52) U.S. Cl.
CPC ......... *H04R 25/505* (2013.01); *H04R 25/305* (2013.01); *H04R 25/453* (2013.01); *H04R 25/604* (2013.01); *H04R 2225/61* (2013.01)

(58) Field of Classification Search
CPC ...... H04R 25/00; H04R 25/30; H04R 25/305; H04R 25/453; H04R 25/505; H04R 25/604; H04R 2225/61
(Continued)

(56) References Cited

U.S. PATENT DOCUMENTS 7,756,283 B2 7/2010 Bramslow
8,532,320 B2 9/2013 Nordahn et al.
(Continued)

FOREIGN PATENT DOCUMENTS

EP 1594344 A2 11/2005
EP 3038384 A1 6/2016
(Continued)

*Primary Examiner* — Harry S Hong
(74) *Attorney, Agent, or Firm* — Schwegman Lundberg & Woessner, P.A.

(57) ABSTRACT

Disclosed herein are systems and methods for eardrum acoustic pressure estimation for hearing device applications. A receiver signal is produced through a receiver of a hearing device, or a physical extension of the receiver, placed inside an ear canal of a user. A microphone signal is sensed, in response to the receiver signal, using a microphone placed outside the ear canal. Based on the receiver signal and the microphone signal, a reliability signal of the microphone signal and a feedback-path signal are computed. A spectral representation signal of the feedback-path signal is computed, and a real-ear response signal is computed using a mathematical combination of the spectral-representation signal and the reliability signal. The computed real-ear response signal is used to modify an operational characteristic of the hearing device, or to make a recommendation for modification of an operational characteristic or a physical characteristic of the hearing device.

20 Claims, 4 Drawing Sheets

(58) Field of Classification Search
USPC .......................... 381/23.1, 60, 312, 314, 320
See application file for complete search history.

(56) References Cited

U.S. PATENT DOCUMENTS

| | | | | |
|---|---|---|---|---|
| 8,542,841 | B2 | 9/2013 | Lopresti et al. | |
| 8,571,224 | B2 | 10/2013 | Recker et al. | |
| 9,107,015 | B2 | 8/2015 | Zhang et al. | |
| 9,271,666 | B2 | 3/2016 | Stirnemann | |
| 2010/0246869 | A1* | 9/2010 | Zhang | H04R 25/70 381/320 |
| 2011/0150231 | A1* | 6/2011 | Natarajan | H04R 25/453 381/60 |
| 2015/0063614 | A1* | 3/2015 | Petersen | H04R 25/30 381/318 |
| 2019/0046089 | A1* | 2/2019 | Pislak | A61B 5/1076 |
| 2019/0082278 | A1* | 3/2019 | Boley | H04R 25/30 |
| 2022/0167101 | A1* | 5/2022 | Jin | H04R 3/04 |
| 2023/0044509 | A1 | 2/2023 | Guo et al. | |

FOREIGN PATENT DOCUMENTS

| | | | |
|---|---|---|---|
| EP | 2846559 | B1 | 11/2018 |
| EP | 4132009 | | 2/2023 |

* cited by examiner

EARDRUM ACOUSTIC PRESSURE ESTIMATION USING FEEDBACK CANCELLER

CROSS-REFERENCE TO RELATED APPLICATION

This patent application claims the benefit of U.S. Provisional Patent Application No. 63/220,118, filed Jul. 9, 2021, which is incorporated by reference herein in its entirety.

TECHNICAL FIELD

This document relates generally to hearing device systems and more particularly to eardrum acoustic pressure estimation using a feedback canceller for hearing device applications.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Hearing aid fitting and parameter adjustment may be dependent upon acoustic pressure at a wearer's eardrum while wearing the hearing aid. Improved methods of estimating eardrum acoustic pressure are needed.

SUMMARY

Disclosed herein, among other things, are systems and methods for eardrum acoustic pressure estimation for hearing device applications. A method includes producing a receiver signal through a receiver of a hearing device, or a physical extension of the receiver, placed inside an ear canal of a user. A microphone signal is sensed, in response to the receiver signal, using a microphone placed outside the ear canal. Based on the receiver signal and the microphone signal, a reliability signal of the microphone signal and a feedback-path signal are computed. A spectral representation signal of the feedback-path signal is computed, and a real-ear response signal is computed using a mathematical combination of the spectral-representation signal and the reliability signal. The computed real-ear response signal is used to modify an operational characteristic of the hearing device, or to make a recommendation for a modification of a physical characteristic or operational characteristic of the hearing device.

Various aspects of the present subject matter include a system including a hearing device including a microphone and a receiver. The hearing device is configured to produce a receiver signal through the receiver of the hearing device, or a physical extension of the receiver, placed inside an ear canal of a user. The system further includes one or more processors programmed to receive a microphone signal, in response to the receiver signal, from the microphone placed outside the ear canal. The one or more processors are further programmed to compute a reliability signal of the microphone signal based on the receiver signal and the microphone signal, to compute a feedback-path signal based on the receiver signal and the microphone signal, to compute a spectral representation signal of the feedback-path signal, and to compute a real-ear response signal using a mathematical combination of the spectral-representation signal and the reliability signal. In some embodiments, an operational characteristic of the hearing device is modified using the computed real-ear response signal. In some embodiments, the computed real-ear response signal is used to make a recommendation for a modification of an operational characteristic or a physical characteristic of the hearing device.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
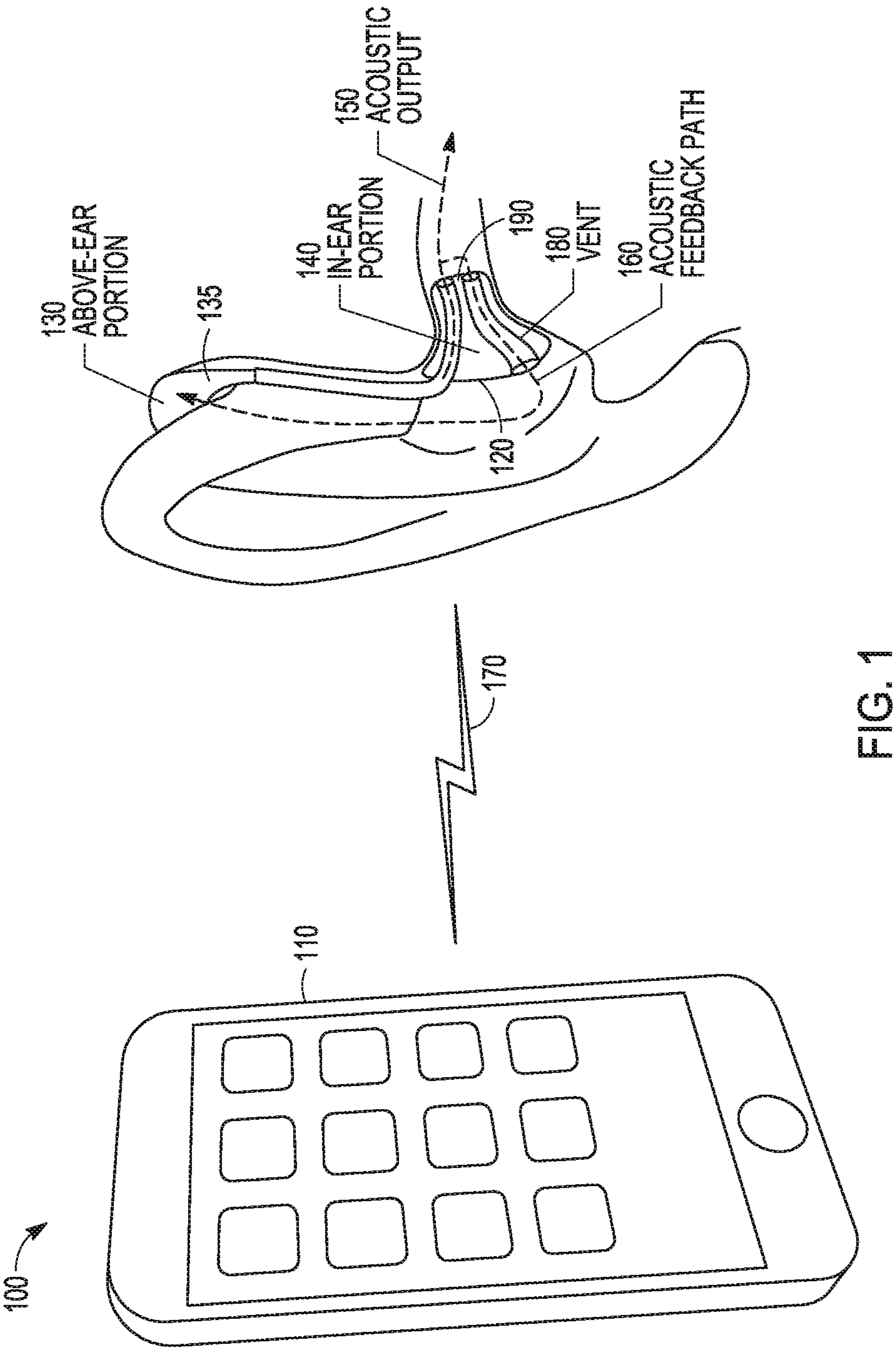
FIG. 1 illustrates a block diagram of a system for eardrum acoustic pressure estimation for hearing devices, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

The present subject matter may be used in all situations in which a hearing aid or other in-the-ear device is placed in a user's ear, and some of its parameters (e.g., amplification gains) are adjusted automatically, taking into account the individual acoustic characteristics of the user's ear, such as characteristics of the residual ear canal with the hearing aid or audio device in place inside the ear.

In one example, the present subject matter may be used during hearing aid fitting, e.g., for automatic adjustment of hearing aid parameters such as amplification gains, in-situ audiometry stimulus levels, tinnitus masker band levels, etc., according to the hearing aid user's estimated real-ear aided response (REAR) estimated based on the maximum stable gains (MSGs) measured during initialization of the feedback canceller (FBC) algorithm, as described herein. In this context, a major advantageous feature of the present subject matter is that it makes it unnecessary for a clinician to perform measurements using a separate, dedicated, expensive real-ear measurement system, including a probe tube.

Audiological best-practices call for measurement of REARs in each ear to be fitted with a hearing aid. These measurements traditionally require the use of expensive dedicated apparatus for real-ear measurement system by trained professionals or audiologists, who insert a probe tube equipped with a microphone inside the user's ear canal, in close proximity to the eardrum, with the hearing aid inserted into the ear. These measurements can be time consuming, delicate and potentially painful for the patient if the eardrum is touched during insertion of the probe tube.

One previous alternative to measuring REARs with a dedicated probe tube system is to measure them using a hearing aid or audio device featuring an in-the-canal microphone. However, the vast majority of hearing devices do not feature a microphone inside the ear canal. Adding such a microphone into the design of these hearing devices is not always possible and, even when possible, usually results in increased production costs and other consequences such as less room for other components on the in-the-canal part of the device, and potential issues during use related to cerumen getting in or on the in-the-canal microphone.

This present subject matter solves the above problems by making it possible to obtain REARs without requiring the use of a probe-tube or in-the-ear-canal microphone. In various embodiments, the present subject matter estimates eardrum sound pressure (or vent effects) of a hearing aid or hearing device user based on acoustic measurements of the feedback path. In various embodiments, an algorithm is provided that can be implemented inside a hearing aid (in firmware or software) and/or in an external device, such as a personal computer or smartphone (in hearing aid fitting software). The algorithm uses maximum stable gain (MSG) estimates derived from an initialization process of a feedback-canceller (FBC) system on the hearing device inside the patient's ear, in various embodiments.

Eardrum sound-pressure and/or vent-effect estimates obtained using the present subject matter can be used to automatically adjust parameters of the user's hearing aid, including but not limited to: amplification gains, low-frequency amplification applied to audio signals streamed into the hearing aid from another audio device, acoustic stimulus level for in-situ audiometry, or tinnitus-stimulus for acoustic therapy for tinnitus. Such automated adjustment of gains based on estimates of individual eardrum sound pressure can provide various benefits during the hearing aid fitting process, including but not limited to: automated individualized adjustments of hearing aid gains, and automated adjustment of stimulus levels during in-situ audiometry. In addition, the automated adjustments can be advantageous subsequent to the fitting process, by providing improved audio sound quality, improved loudness comfort, improved speech understanding, and improved tinnitus-masker efficacy/efficiency. Further, the present subject matter may be combined with a perceptual hearing threshold measurement.

REARs refer to measurements of pressure inside the ear canal, with the hearing aid positioned inside the ear as it would during normal use, as opposed to real-ear unaided responses (REURs), which are measured with the user's ear canal unobstructed by a hearing aid. Previously, REARs were measured using a probe-tube equipped with a microphone, which is inserted into the ear canal between 3 and 15 mm from the eardrum.

As provided herein, a vent effect is the difference in sound pressure inside the ear canal, with the device in place, relative to some reference condition (e.g., completely occluded ear canal or completely open ear canal). The term 'vent' should not be interpreted to mean solely a vent in the traditional sense of an opening in a custom hearing aid, but rather any acoustic opening or leakage, such as might occur, for instance, in a receiver-in-canal (RIC) hearing-aid equipped with a stock earbud.

Maximum stable gains (MSGs), also referred to as "added stable gains" (ASGs) or "gain margins", designate the highest sound amplification gains that can be achieved by a hearing device positioned in the ear canal, without triggering a significant acoustic feedback signal resulting from an electro-acoustic loop between the receiver or body of the device and one of the microphones on the device, that cannot be effectively suppressed by the feedback canceller (FBC) system. MSGs are usually measured after the device is inserted into the ear canal for the first time by a professional hearing care provider or by the user himself, during a process commonly referred to as "FBC initialization". This FBC initialization process is usually performed at least once prior to the initial adjustment (usually, performed by a hearing care professional) of certain hearing aid parameters, such as, in particular, the gains for sound amplification delivered by the device into the user's ear. In addition, MSGs can be measured or estimated at other times. For example, MSGs can be measured or estimated periodically after the initial fitting, either just after the user puts the hearing aid or audio device into his ear or while the devices are being used and running the FBC (e.g., the adaptive filter used in the feedback cancellation algorithm).

FIG. 1 illustrates a block diagram of a system 100 for eardrum acoustic pressure estimation for hearing devices, according to various embodiments of the present subject matter. The system 100 may include an external device 110, such as a personal computer or smartphone, and a hearing device 120. Other types of external devices may be used without departing from the scope of the present subject matter. The hearing device 120 may include an above-ear portion 130 and an in-ear portion 140 which may include a vent 180. In an example, the above-ear portion 130 may include an acoustic input transducer (e.g., microphone 135) for converting received acoustic audio into digital or analog audio signals.

In various embodiments, hearing device 120 is configured to produce a receiver signal (such as a sound signal) through a receiver 190 of the hearing device 120, or a physical extension of the receiver (such as a sound tube of a behind-the-ear device) placed inside an ear canal of a user. The system 100 further includes one or more processors programmed to receive a microphone signal, in response to the receiver signal, from the microphone 135 placed outside the ear canal. In various embodiments, the one or more processors may be in the hearing device 120, in the external device 110, or a combination of both the hearing device 120 and the external device 110. The one or more processors are further programmed to compute a reliability signal of the microphone signal based on the receiver signal and the microphone signal, to compute a feedback-path signal based on the receiver signal and the microphone signal, to compute a spectral representation signal of the feedback-path signal, and to compute a real-ear response signal using a mathematical combination of the spectral-representation signal and the reliability signal. In some embodiments, an operational characteristic of the hearing device 120 is modified using the computed real-ear response signal. In some embodiments, the computed real-ear response signal is used to make a recommendation for a modification of a physical characteristic or operational characteristic of the hearing device 120. In some embodiments, the reliability signal includes a signal-to-noise ratio of the microphone signal. The spectral representation signal includes a Fourier transform of the feedback-path signal, in various embodiments.

The hearing device 120 may communicate wirelessly 170 with the external device 110, or using a wired connection, to transmit data or audio for set up and programming the hearing device 120, in some embodiments. In some embodiments a wireless, non-acoustic audio stream may be transmitted from a wireless audio source to the hearing assistance device 120, which may be amplified and provided to a user as an acoustic output 150. A portion of the acoustic output 150 may be fed back to the microphone on the above-ear portion 130, such as via the example acoustic feedback path 160.

Various embodiments of the present subject matter include a method for eardrum acoustic pressure estimation. The method may include playing a receiver signal through a receiver (loudspeaker), or a physical extension of the receiver, placed inside the ear canal of a user, measuring and recording a microphone signal, in response to the receiver signal, with a microphone placed outside the ear canal, based on the receiver signal and the microphone signal, computing a third, 'reliability' signal (e.g., signal-to-noise ratio) of the microphone signal, based on the receiver and microphone signals, computing a feedback-path signal, computing a fourth signal, corresponding to a spectral representation (e.g., Fourier transform) of the feedback-path signal, using a mathematical combination of the spectral-representation signal and the reliability signal to compute a real-ear response signal and/or a vent-effect estimate, and using the computed real-ear response signal or vent-effect estimate to automatically modify an operational characteristics of the hearing device and/or make a recommendation to the user or to a clinician for a modification of physical (e.g., change earbud, increase/decrease vent) or operational characteristics (e.g., gains) of the hearing device.

In various embodiments, the method may be combined with measurement of the user's hearing threshold at, at least one frequency, where the threshold is measured in response to sounds played through the hearing device receiver. In some embodiments, the method may further include a perceptual preference test (e.g., paired comparison) wherein the device user is presented with stimuli processed through the adjusted hearing aid parameters (based on the REAR estimate), plus possibly some comparison stimulus (e.g., unadjusted), and asked to indicate a preference. The results of this preference test may then be used to verify, or further improve, the adjustment. The present subject matter may be implemented in software, such as in the fitting software of a hearing aid or audio device running on a personal computer or any other electronic medium equipped with a processor (smartphone, tablet, or other device), or on a processor of the hearing aid or audio device itself.

According to various embodiments, the feedback path measurement occurs during the initial fitting of the device, which can be performed either by a clinician, or by the user in case of device sold direct to consumer. According to various embodiments, FBC data collection (feedback path and MSG estimation) occurs post initial fitting, during run-time operation of the hearing aid on the user's ear. In various embodiments, FBC initialization is performed to estimate MSGs.

The signal played back through a receiver (loudspeaker) is defined as u[k], at (discrete) time k, and the microphone signals are computed using:

$$y[k]=h[k]*u[k]+n[k],$$

where h[k] denotes the (to-be-estimated) feedback path (also known as impulse response), and n[k] denotes a disturbance (e.g., people talking, background noise in a room), assumed to be uncorrelated with u[k].

The reliability signal is computed from the (known) loudspeaker signal u[k] and the microphone signal y[k]. This reliability signal could be for instance the coherence or the signal-to-noise ratio (SNR). To identify the frequency-dependent SNR, first compute the coherence between the loudspeaker signal and the microphone signal. The coherence is defined as $$Coh(\omega, u[k], y[k]) = \frac{|S_{uy}(\omega)|^2}{S_{uu}(\omega)S_{yy}(\omega)}$$

where $S_{uy}(\omega)$ denotes the cross-spectral density at radial frequency ω between the loudspeaker signal u[k] and the microphone signal y[k]. The coherence takes values between 0 (u[k] and y[k] are completely uncorrelated) and 1 (u[k] and y[k] are fully correlated). The coherence can hence be used as a bounded weighting in a prediction method. Furthermore, from Coh(ω, u[k], y[k]) the frequency-dependent estimate of the SNR can be obtained as $$SNR(\omega, u[k], y[k]) = \frac{Coh(\omega, u[k], y[k])}{1 - Coh(\omega, u[k], y[k])}$$

The signal to noise ratio can be similarly defined as $$SNR(\omega, h[k], u[k], n[k]) = \frac{H^2(\omega)S_{uu}(\omega)}{S_{nn}(\omega)}$$

Furthermore, using the loudspeaker signal u[k] and the microphone signal y[k], an (estimate of) the acoustic feedback path signal can be computed, e.g., using an adaptive filtering algorithm like the normalized least-mean squares (NLMS) algorithm, or (assuming a time-invariant acoustic feedback path) using a closed-form expressions as $$\hat{h}=R_{uu}^{-1}r_{uy}$$

where $R_{uu}$ denotes the auto-correlation matrix of u[k] and $r_{uy}$ denotes the cross-correlation vector between u[k] and y[k]. From the feedback path estimate, the maximum stable gain (MSG) is estimated/computed as $$\widehat{MSG}(\omega)=-10\log_{10}|\hat{H}(\omega)|^2$$

Using the coherence or the signal-to-noise ratio as well as the estimated maximum stable gain, the vent effect can be estimated by using a weighted version of the estimated MSG, or by estimating the estimation error of the MSG depending on the reliability signal and using this to correct the estimation procedure.

The present subject matter thus provides for the computation of a reliability signal (quantifying the reliability of the feedback-path signal) based on a combination of the receiver and microphone signals, and using this reliability signal, in combination with the feedback path signal, to estimate a real-ear response or vent effect. Previous methods do not include automatically assessing the reliability of the measured microphone signal in response to the receiver signal; instead, they rely on visual or manual checks by the audiologist or hearing care provider.

The present subject matter uses a reliability signal, and provides specific and concrete mathematical methods for computing such a signal. The reliability signal can be used advantageously to determine automatically whether the feedback path signal is sufficiently accurate to support reliable estimation of a real-ear response or vent effect, and to determine automatically which parts (e.g., frequencies or frequency bands) of the feedback-path signal are accurate (high signal-to-noise ratio) and can be used to reliably estimate the real-ear response or the vent-effect, which is a form of 'automatic relevance determination' (ARD). The present subject matter may also be integrated into an earbud-recommender system, which includes a warning system that warns the clinician when the measured/estimated vent effect in a user's ear does not match the current model assumptions in the fitting software.

Figure 2:
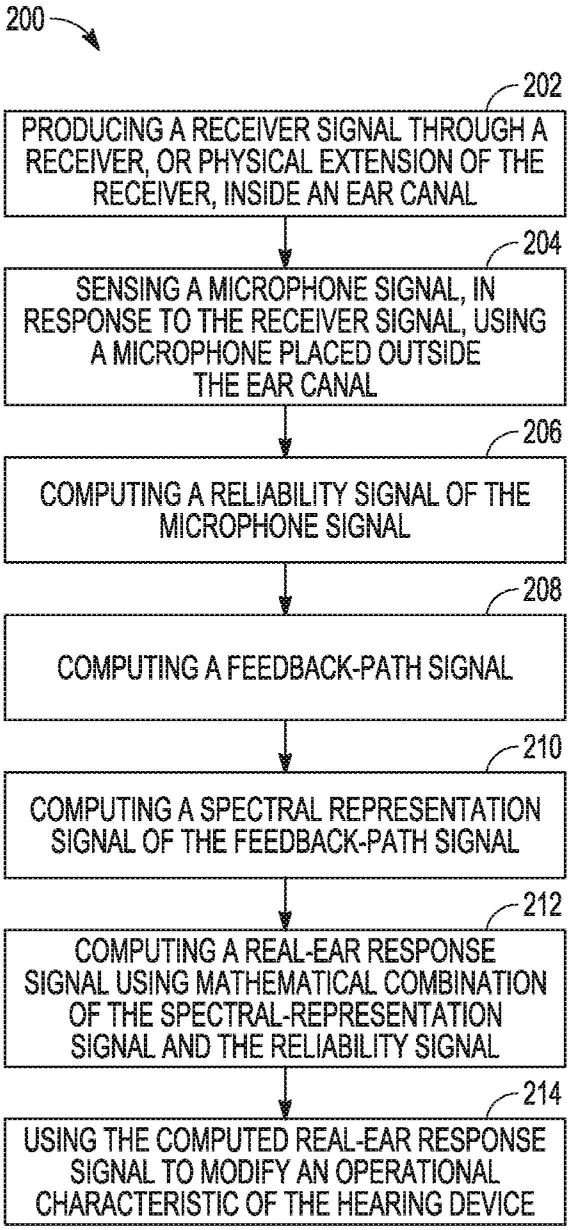
FIG. 2 illustrates a flow diagram of a method for eardrum acoustic pressure estimation for hearing devices, according to various embodiments of the present subject matter.

FIG. 2 illustrates a flow diagram of a method 200 for eardrum acoustic pressure estimation for hearing devices, according to various embodiments of the present subject matter. The method 200 includes producing 202 a receiver signal through a receiver of a hearing device, or a physical extension of the receiver, placed inside an ear canal of a user. At 204, a microphone signal is sensed, in response to the receiver signal, using a microphone placed outside the ear canal. Based on the receiver signal and the microphone signal, a reliability signal of the microphone signal is computed 206 and a feedback-path signal is computed 208. A spectral representation signal of the feedback-path signal is computed 210, and a real-ear response signal is computed 212 using a mathematical combination of the spectral-representation signal and the reliability signal. The computed real-ear response signal is used 214 to modify an operational characteristic of the hearing device, in various embodiments.

In various embodiments, the method 200 further includes recording the sensed microphone signal in a memory. Computing the reliability signal includes computing a signal-to-noise ratio or magnitude squared coherence of the microphone signal, in various embodiments. In some embodiments, computing the spectral representation signal includes computing a Fourier transform of the feedback-path signal. Computing the real-ear response signal includes computing a vent-effect estimate, in some embodiments. In various embodiments, the method further includes measuring a hearing threshold of the user at a selected frequency in response to the sound signal from the receiver of the hearing device.

According to various embodiments, the method further includes presenting the user with a first audio stimulus that has been modified using the computed real-ear response signal, presenting the user with a second audio stimulus that has not been modified, directing the user to indicate a preference between the first audio stimulus and the second audio stimulus, and using the indicated preference to verify the modification of the operational characteristic. In some embodiments, the method further includes presenting the user with a first audio stimulus that has been modified using the computed real-ear response signal, presenting the user with a second audio stimulus that has not been modified, directing the user to indicate a preference between the first audio stimulus and the second audio stimulus, and using the indicated preference to further modify of the operational characteristic.

Figure 3:
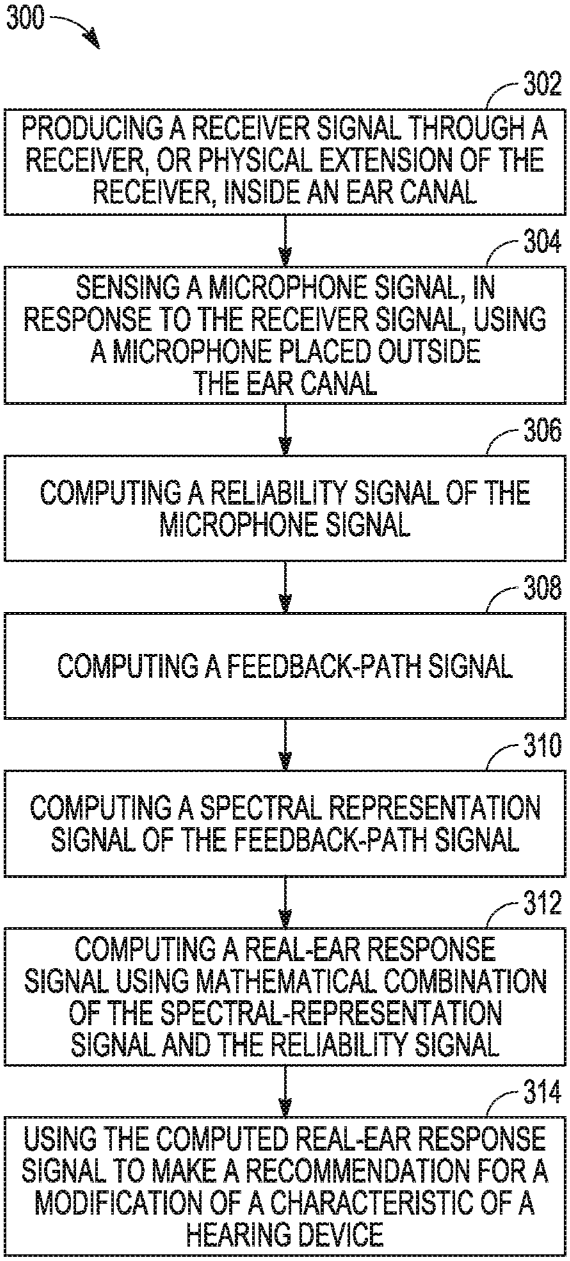
FIG. 3 illustrates a flow diagram of a method for eardrum acoustic pressure estimation for hearing device applications, according to various embodiments of the present subject matter.

FIG. 3 illustrates a flow diagram of a method 300 for eardrum acoustic pressure estimation for hearing device applications, according to various embodiments of the present subject matter. The method 300 includes producing 302 a receiver signal through a receiver of a hearing device, or a physical extension of the receiver, placed inside an ear canal of a user. At 304, a microphone signal is sensed, in response to the receiver signal, using a microphone placed outside the ear canal. Based on the receiver signal and the microphone signal, a reliability signal of the microphone signal is computed 306 and a feedback-path signal is computed 308. A spectral representation signal of the feedback-path signal is computed 310, and a real-ear response signal is computed 312 using a mathematical combination of the spectral-representation signal and the reliability signal. The computed real-ear response signal is used 314 to make a recommendation for a modification of a characteristic of the hearing device, in various embodiments.

According to various embodiments, making a recommendation for a modification of a characteristic of the hearing device includes making a recommendation for a modification of a physical characteristic of the hearing device. According to some embodiments, making a recommendation for a modification of a physical characteristic of the hearing device includes making a recommendation to change earbud size. Making a recommendation for a modification of a physical characteristic of the hearing device includes making a recommendation to increase vent size, in some embodiments. In some embodiments, making a recommendation for a modification of a physical characteristic of the hearing device includes making a recommendation to decrease vent size.

According to various embodiments, making a recommendation for a modification of a characteristic of the hearing device includes making a recommendation for a modification of an operational characteristic of the hearing device. In some embodiments, making a recommendation for a modification of an operational characteristic of the hearing device includes making a recommendation to increase gain of the hearing device. In other embodiments, making a recommendation for a modification of an operational characteristic of the hearing device includes making a recommendation to decrease gain of the hearing device.

Figure 4:
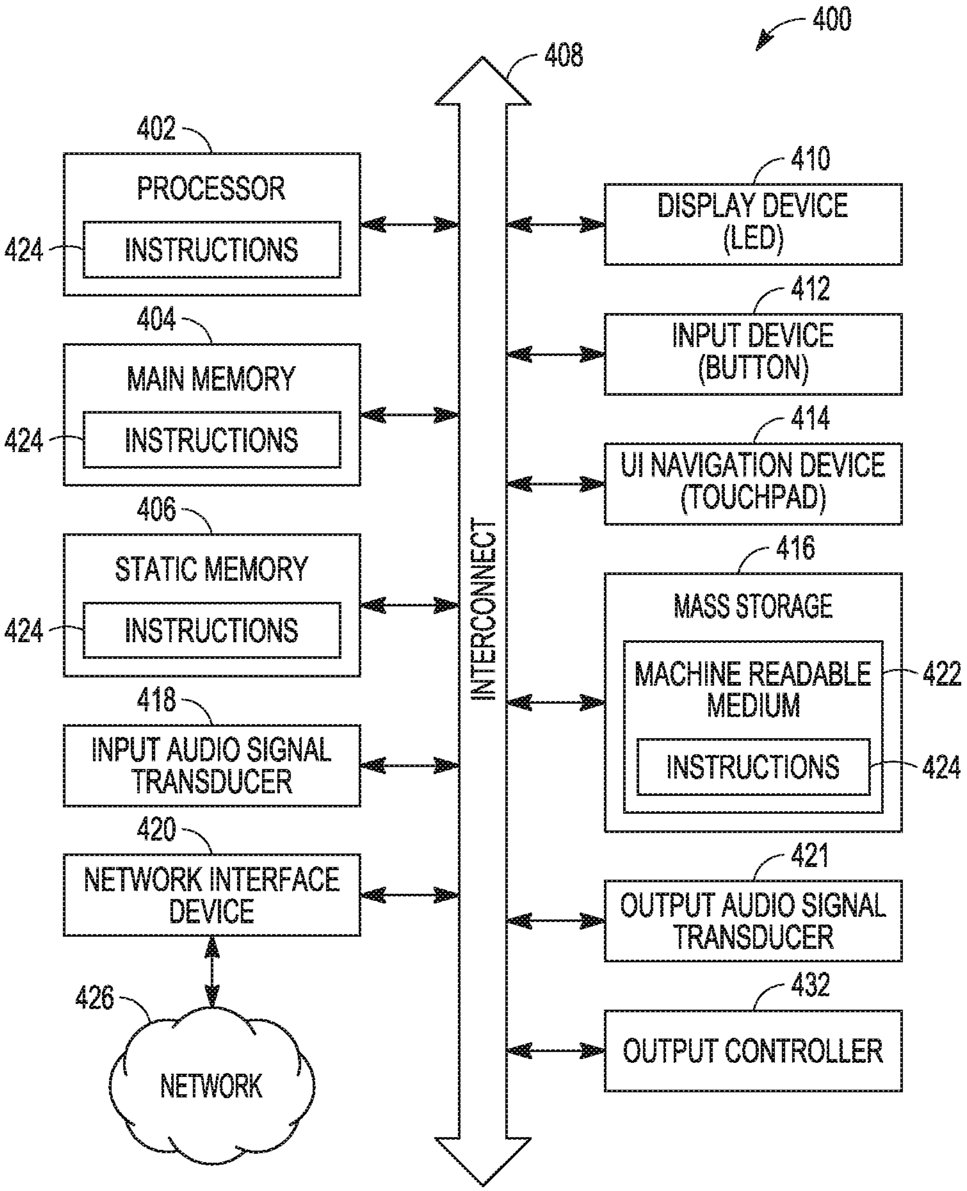
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11(wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some embodiments. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:

producing a receiver signal through a receiver of a hearing device, or a physical extension of the receiver, placed inside an ear canal of a user;

sensing a microphone signal, in response to the receiver signal, using a microphone placed outside the ear canal;

based on the receiver signal and the microphone signal, computing a reliability signal of the microphone signal;

based on the receiver signal and the microphone signal, computing a feedback-path signal;

computing a spectral representation signal of the feedback-path signal;

computing a real-ear response signal using a mathematical combination of the spectral-representation signal and the reliability signal; and using the computed real-ear response signal to modify an operational characteristic of the hearing device, or to make a recommendation for a modification of a physical characteristic or operational characteristic of the hearing device.

2. The method of claim 1, wherein using the computed real-ear response signal to modify an operation characteristic of the hearing device includes using the computed real-ear response signal to automatically modify gain of the hearing device.

3. The method of claim 1, wherein making a recommendation for a modification of a physical characteristic of the hearing device includes making a recommendation to change earbud size.

4. The method of claim 1, wherein making a recommendation for a modification of a physical characteristic of the hearing device includes making a recommendation to increase vent size.

5. The method of claim 1, wherein making a recommendation for a modification of a physical characteristic of the hearing device includes making a recommendation to decrease vent size.

6. The method of claim 1, wherein making a recommendation for a modification of an operational characteristic of the hearing device includes making a recommendation to increase gain of the hearing device.

7. The method of claim 1, wherein making a recommendation for a modification of an operational characteristic of the hearing device includes making a recommendation to decrease gain of the hearing device.

8. The method of claim 1, further comprising:
recording the sensed microphone signal in a memory.

9. The method of claim 1, wherein computing the reliability signal includes computing a signal-to-noise ratio of the microphone signal.

10. The method of claim 1, wherein computing the reliability signal includes computing a magnitude squared coherence of the microphone signal.

11. The method of claim 1, wherein computing the spectral representation signal includes computing a Fourier transform of the feedback-path signal.

12. The method of claim 1, wherein computing the real-ear response signal includes computing a vent-effect estimate.

13. The method of claim 1, further comprising:
measuring a hearing threshold of the user at a selected frequency in response to the receiver signal.

14. The method of claim 1, further comprising:
presenting the user with a first audio stimulus that has been modified using the computed real-ear response signal;
presenting the user with a second audio stimulus that has not been modified;
directing the user to indicate a preference between the first audio stimulus and the second audio stimulus; and
using the indicated preference to verify the modification of the operational characteristic.

15. The method of claim 1, further comprising:
presenting the user with a first audio stimulus that has been modified using the computed real-ear response signal;
presenting the user with a second audio stimulus that has not been modified;
directing the user to indicate a preference between the first audio stimulus and the second audio stimulus; and
using the indicated preference to further modify of the operational characteristic.

16. A system, comprising:
a hearing device including a microphone and a receiver, the hearing device configured to:
produce a receiver signal through the receiver of the hearing device, or a physical extension of the receiver, placed inside an ear canal of a user; and
one or more processors programmed to:
receive a microphone signal, in response to the receiver signal, from the microphone placed outside the ear canal;
compute a reliability signal of the microphone signal based on the receiver signal and the microphone signal;
compute a feedback-path signal based on the receiver signal and the microphone signal;
compute a spectral representation signal of the feedback-path signal;
compute a real-ear response signal using a mathematical combination of the spectral-representation signal and the reliability signal; and
modify an operational characteristic of the hearing device, or make a recommendation for a modification of a physical characteristic or operational characteristic of the hearing device, using the computed real-ear response signal.

17. The system of claim 16, wherein the one or more processors are included with the hearing device.

18. The system of claim 16, wherein the one or more processors are included in a personal computer.

19. The system of claim 16, wherein the reliability signal includes a signal-to-noise ratio of the microphone signal.

20. The system of claim 16, wherein the spectral representation signal includes a Fourier transform of the feedback-path signal.

* * * * *